United States Patent [19]
Larrick

[11] 3,765,855
[45] Oct. 16, 1973

[54] ELECTRO-IONIC METHOD OF STRENGTHENING GLASS

[75] Inventor: Benjamin F. Larrick, Silver Spring, Md.

[73] Assignee: The United States of America as represented by the Secretary of the Navy, Washington, D.C.

[22] Filed: Dec. 30, 1971

[21] Appl. No.: 213,899

[52] U.S. Cl............................ 65/30, 65/116, 161/166
[51] Int. Cl.............................................. C03c 21/00
[58] Field of Search................................ 65/116, 30

[56] References Cited
UNITED STATES PATENTS

| | | | |
|---|---|---|---|
| 3,218,220 | 11/1965 | Weber................................ | 65/30 X |
| 3,287,200 | 11/1966 | Hess et al. ........................ | 65/30 X |
| 2,779,136 | 1/1957 | Hood et al. ........................ | 65/30 X |
| 3,681,041 | 8/1972 | D'Huart................................ | 65/30 |
| 3,632,321 | 1/1972 | Plumat et al............................ | 65/30 |

Primary Examiner—S. Leon Bashore
Assistant Examiner—Kenneth M. Schor
Attorney—R. S. Sciascia et al.

[57] ABSTRACT

A process for strengthening glass comprising (1) subjecting one face of sodium or lithium containing glass at a temperature above its annealing point to a current from a molten salt to affect replacement of sodium or lithium ions by larger ions, (2) repeating step (1) but using a molten sodium or lithium salt and allowing current to flow for a time greater than the time to be used in steps (3) and (5) combined; (3) subjecting the opposite face of the glass as in step (1) but with the current reversed, (4) chill-tempering the glass and (5) repeating step (3) but at a temperature which is below the strain point of the glass.

20 Claims, 9 Drawing Figures

STRESS PROFILE

STRESS PROFILES IN GLASS TREATED BY IMMERSION METHOD.

STRESS PROFILES IN GLASS TREATE BY WEBERS ELECTROLYTIC METHOD.

COMPOSITION PROFILE

COMPOSITION PROFILE

COMPOSITION PROFILE

INVENTOR
Benjamin F. Larrick

STRESS PROFILE

COMPOSITION PROFILE

STRESS PROFILE

ELECTRO-IONIC METHOD OF STRENGTHENING GLASS

BACKGROUND OF THE INVENTION

This invention generally relates to glass and more particularly to a method of strengthening glass.

It is generally known that glass may be strengthened by introducing compressive stress in the surface layer. Then when strain is applied, the added compressive stress must be overcome before the glass can break. The mechanism of breakage is generally believed to involve a concentration of tensile stress at the ends of the flaws or cracks in the surface layer of the glass. If this is so, then greater strengthening can be obtained if a high level of compressive stress can be obtained below the depth of the deepest flaw or crack.

The strength of surface-compressed glass may usually be considered as equal to the level of maximum compressive stress that is present in the surface layer at a depth greater than that of the deepest flaw or crack. Surface-compression strengthening can be achieved in glasses that contain alkali metal oxides as ingredients of the composition by chemical means. For example, soda glass or soda-lime glass may be surface-compressed by immersion in molten potassium nitrate. The larger potassium ions from the molten salt diffuse into the glass and the smaller sodium ions diffuse into the salt. The highest concentration of immigrant potassium ions in the glass is found at the surface, and the concentration diminishes rapidly toward the interior of the glass. Thus, if the temperature has been kept well below the strain point of the glass so that no viscous flow of the glass can occur, then the maximum compressive stress is at the glass surface and the stress level diminishes inward in correspondence to the concentration gradient of the immigrant ions. The compressive stress is the direct result of the substitution of the larger potassium ions for the smaller sodium ions in the glass. But if the temperature is kept near the strain point during treatment, then viscous flow of the glass occurs and some of the stress is relieved. The amount of stress relief is greater near or at the surface because the surface has been internally strained for the longest time. The result, when viscous flow occurs is a greatly diminished stress level at the surface; a relatively low stress maximum deeper within the surface; and a correspondingly reduced strength. Typical stress profiles that might be obtained in soda-lime glass treated for about eight to twelve hours are shown in FIG. 1.

An electro-ionic method of glass strengthening was disclosed by Neill Weber, U. S. Pat. No. 3,218,220 (Nov. 16, 1965). It differs in principle from the immersion method only in terms of the driving force for the ion diffusion process. The apparatus for the electro-ionic method is more complicated in that two separate baths of molten salt are needed; one on each side of the glass to be treated. In each salt bath is a metal electrode. When a large enough potential difference is applied between the electrodes, ions flow in one direction only through the glass. Large ions flow from the salt bath into the electrode surface at the anode side, and small ions flow from the glass into the second salt bath at the cathode side. Thus, both the immigrant and emigrant ions flow in the same direction and compressive stress is produced at the anode side only. The direction of current flow must be reversed to achieve ion exchange on both sides. The advantage of this method lies in the fact that compressive strengthening may be achieved to greater depths in shorter time than with the simple immersion method. In addition, the fraction of sodium ions originally present that can be replaced by potassium ions is higher; this is a consequence of the fact that both kinds of ions flow in the same direction. The inner edge of the composition profile or the stress profile is much sharper. FIG. 2 illustrates the stress profile that might be obtained after about twenty to thirty minutes of treatment by this method. Stress relief is again shown at higher temperatures; but the amount of stress relief is small at the inner edge because the time interval is so short.

A third and much older method of surface-compressing glass is by chill-tempering or case-hardening. This is embodied in the invention of William W. Shaver, U. S. Pat. No. 2,205,180 (June 18, 1940). In this method, the glass is heated to a temperature above the strain point, in the annealing range, and then suddenly immersed in a bath containing a molten salt at a temperature below the strain point. The surface layer is the first to cool, and the underlying glass cools more slowly. As the underlying glass shrinks, it forces the already-cooled outer layer into compression. This method however generally gives rather low levels of compressive stress, and only for depths of $\approx 0.05$ mm or less.

In view of the shortcomings of the prior art methods of strengthening glass, research in this area of technology has continually sought better methods of producing strong glass.

SUMMARY OF THE INVENTION

Accordingly one object of this invention is to provide a process for producing high compressive stress in glass at depths below the depth of surface flaws and cracks.

Another object of this invention is to provide a process for producing high compressive stress in glass at depths below the depth of surface flaws or cracks without introducing any significant tensile stress in the region where flaws or cracks are present either during the course of the process or after it is complete.

Another object of this invention is to provide a process capable of achieving a simultaneous buildup of compressive stress levels on opposite sides of a piece of glass.

A still further object of this invention is to provide a process for obtaining relatively higher levels of compression than might be obtained by other methods.

Yet another object of this invention is to provide a process for strengthening glass which can be performed in a relatively short period of time.

A still further object of this invention is to provide a process for strengthening glass which does not require extensive pretreatments of glass such as by requiring etching or annealing.

These and other objects of this invention are accomplished by a process for strengthening glass comprising (1) subjecting one face of sodium or lithium containing glass at a temperature above its annealing point, but below its softening point, to a current from a molten salt which contains cations that are larger than sodium or lithium to affect replacement of a portion of the sodium or lithium ions by said larger ions; (2) repeating step (1) but using a molten sodium or lithium salt and allowing the current to flow for a period greater than the time of steps (3) and (5) combined; (3) subjecting the opposite face of the glass as in step (1) and for a time about equal to the time used in step (1) but with the current reversed; (4) Chill-tempering the glass and (5) repeating step (3) but at a temperature which is below the strain point of the glass and for a period of time such that the time of steps (3) and (5) is less than the time of step (2).

BRIEF DESCRIPTION OF THE DRAWINGS

Still other objects and many of the attendant advantages of the present invention will be readily appreciated as the same becomes better understood by reference to the following detailed description when considered in connection with the accompanying drawings in which.

DESCRIPTION OF THE PREFERRED EMBODIMENT

Figure 1:
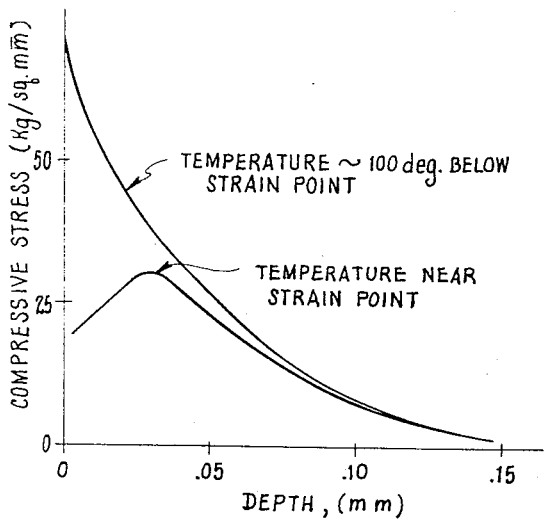
FIG. 1 is a graph which depicts the stress profile that can be expected in glass which is treated by the immersion method of strengthening glass which has hereinbefore been described.
Figure 2:
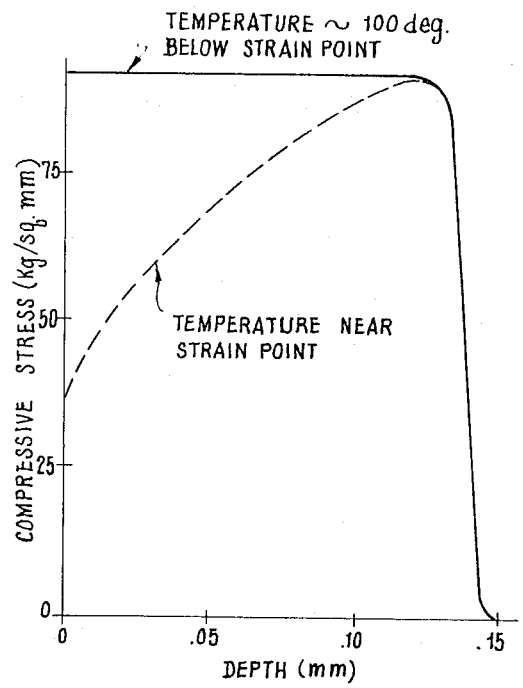
FIG. 2 is a graph of the stress profile which one obtains when glass is treated by Weber's electrolytic glass strengthening method which has also hereinbefore been discussed.

The five step process of the present invention can be performed on various types of glass provided that the glass article to be treated has two faces. As will be discussed in greater detail hereinafter it is necessary that the article to be treated have two faces because steps (1) and (2) are performed on one face while step (3) and (5) are performed on the opposite face. Thus, if the article to be treated is a cube (which has 6 surfaces) one can treat all 6 surfaces, or 4 of them or 2 of them provided that steps (1) and (2) of the instant process are conducted on the face opposite the face on which steps (3) and (5) are conducted. With respect to a hollow glass tube the outer surface is considered one face and the inner surface would be considered the second face. Although it is not necessary that the two faces to be treated be exactly parallel to each other the most strengthening would be obtained when the two faces to be treated are parallel or near parallel. In other words it is preferred that the glass article to be treated have a uniform thickness throughout but the process of this invention can be used to strengthen glass articles which do not have a uniform thickness.

The process of the instant invention can be used to treat any silicate glass which contains at least about 20 mole percent of sodium oxide. It can also be used on any silicate glass which contains at least about 20 mole percent lithium oxide. Furthermore, the process can be applied to any silicate glass which contains both sodium oxide and lithium oxide provided that the mole percent of lithium and sodium oxides combined is at least about 20 mole percent. Furthermore, although the process will strengthen glass of any thickness it is preferred to use glass which is from about 1–50mm thick.

In the first step of the process of this invention one face of the silicate glass, while at a temperature above its annealing point, but below its softening point, is subjected to a current from a molten salt to affect replacement of the sodium and/or lithium ions by larger ions. The molten salt must of course contain cations which are larger than the sodium and/or lithium ions which are being replaced. Any of the art recognized salts that have been used in the prior art to replace sodium and/or lithium ions may be used. The preferred cations are sodium, potassium, copper, silver and mixtures thereof while the preferred anions are nitrate, nitride, chloride, bromide and cyanide. Potassium nitrate is an especially preferred salt.

As will be recognized by those skilled in the art, it is not possible to use unlimited current flow because the glass will heat up. Thus in selecting a current flow it should be kept in mind that it is preferable to use low current flows for long periods of time rather than to use higher current flows for short periods of time. Current flows of 1–10 milliamps/cm$^2$ are recommended.

As will also be recognized by those skilled in the art the amount of time for current flow and the current flow itself are determined by the amount of charge transfer desired. Thus the more charge transfer desired the longer time of current flow should be used for a constant current flow. As much charge replacement as desired may be effected but replacements in the area of one-twentieth of the ions present significantly increase the strength of the glass.

Any of the well known prior art apparatus, such as that disclosed by the Weber patent hereinbefore referred to, can be used to carry out all of the electrolytic steps of this invention.

Figure 3:
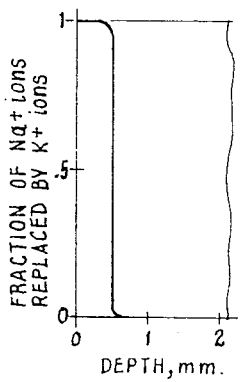
FIGS. 3–5 are graphical composition profiles of glasses which have been treated according to steps 1–3 of the process of this invention.

In the case of a silicate glass which contains only sodium the composition profile after step (1) would be similar to that of FIG. 3 when potassium ions have been used to replace the sodium ions. As will be seen in FIG. 3, all of the sodium ions near the surface of the glass would be replaced by the larger potassium ions.

Step (2) of the instant process involves the same apparatus and procedures as step (1) except that now a molten sodium and/or lithium containing salt is used. In this step the larger ions which were introduced in step (1) migrate toward the interior of the glass and the outer portion of the glass again contains sodium and/or lithium ions. Although it is not necessary that the molten salt used in step (2) have the same ions as the glass, it is preferred that they be the same.

Figure 4:
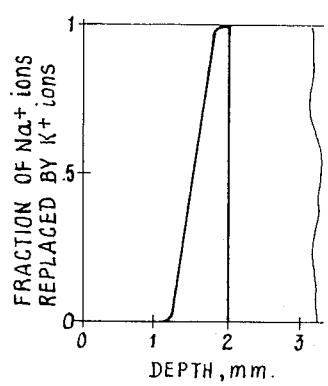

Furthermore, as will hereinafter become more apparent, it is desirable that the charge transfer in this step be greater than the charge transfer in step (3) and (5) combined. In order to achieve uniform strengthening on all faces of the glass object under treatment it is advantageous to conduct step (2) for about three times as long as step (1) with the same current flow. It should be understood by those skilled in the art that current flow may be varied and that it would be more accurate to say that it is preferred that the charge transfer in steps (2) be about three times the charge transfer of step (1). FIG. 4 is a graphical composition profile of the glass as it would appear after step (2) has been conducted for an amount of time which has resulted in three times the charge transfer of step (1). As can be seen from this graph the larger potassium ions have now migrated into the glass to a depth about three times greater than at the end of step (1).

Figure 5:
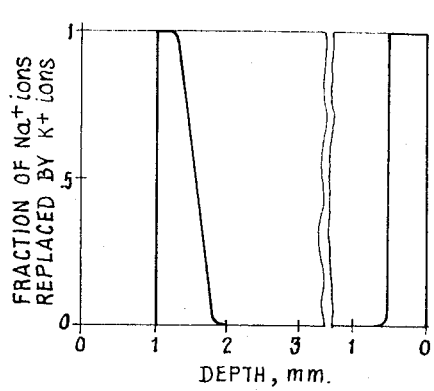

Step (3) of this process involves repeating step (1) but with the current reversed so that the glass face opposite to the face treated in step (1) has the smaller ions replaced by larger ions. Of course as this process is conducted the ions originally introduced into the glass in step (1) and migrated deeper into the glass in step (2) start to migrate back again toward the face in step (3). FIG. 5 is a graphical representation of the composition profile after step (3). Although it is not required it is preferable to transfer about the same amount of charge transferred in step (1).

Figure 6:
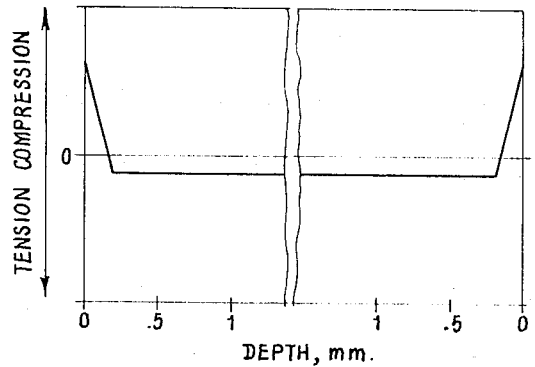
FIG. 6 is a graphical representation of the stress profile of glass after it has been chill tempered according to step (4) of the process of this invention.

Step (4) involves chill-tempering the glass by suddenly placing it in a molten salt bath that is maintained at a temperature below the strain point of the glass. This step causes compression at the surfaces and FIG. 6 is a graphical representation of the stress profile of the glass after step (4).

Figure 7:
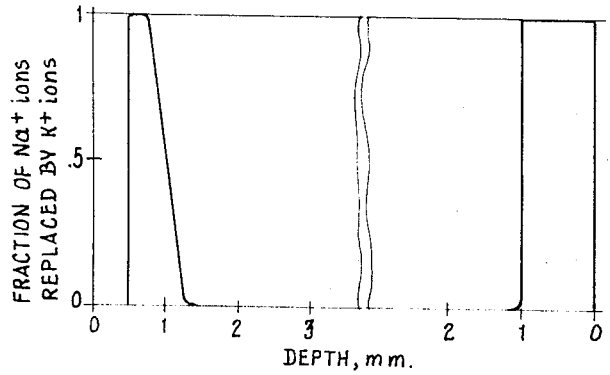
FIG. 7 is a graphical representation of the composition profile of glass which is obtained after performing step (5) of the process of this invention.
Figure 8:
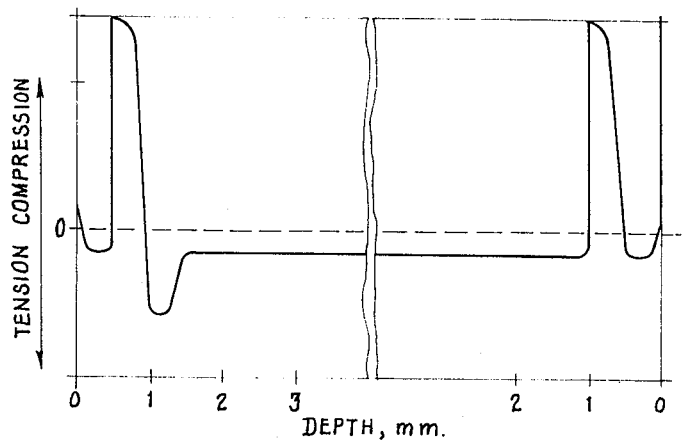
FIG. 8 is a graphical representation of the stress profile of glass which is obtained after performing step (5) of the process of this invention.

The final step involves conducting the same procedures as step (3) but at a temperature which is below the strain point of the glass. In this step the large ions that were introduced into the glass in step (3) are migrated into the body of the glass and more of these larger ions are introduced into the glass. Conversely the larger ions which were introduced in step (1) migrate toward the surface of the glass. Thus the smaller sodium and/or lithium ions are replaced by the larger ions simultaneously in two regions near both surfaces of the glass. Compressive stress, produced simultaneously near both surfaces, is the result. FIG. 7 shows the composition profile after step (5) and FIG. 8 shows the final stress profile. It can be seen that the chill-tempered compression at the surface, on both sides, remains. This slight compression, introduced in step (4) has the advantage that, without it, accidental abrasion of the surface might cause spalling.

It is a preferred part of this process that the treatment depths for all of the steps be chosen so that compressive stress is produced only at depths deeper than the deepest flaw in the glass. It is generally presumed that such flaws extend no deeper than 0.5mm and such an assumption was used in obtaining FIGS. 2, 3, 4 and 6.

The general nature of the invention having been set forth, the following example is presented as specific illustrations thereof. It will be understood that the invention is not limited to this specific example but is susceptible to various modifications that will be recognized by one of ordinary skill in the art.

EXAMPLE

Figure 9:
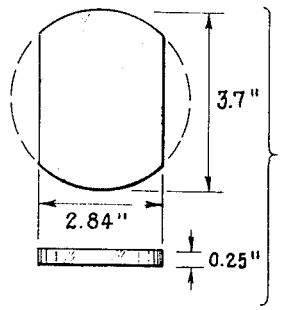
FIG. 9 is a diagram of the glass sheet used in the Example of this invention.

A piece of glass which has been obtained by cutting the edges of a glass disc with a diameter of about 3.7 inches and which has the dimensions depicted in FIG. 9, is used in the process of this invention. The chemical composition and properties of the glass are as follows:

$SiO_2$  61.1 % by weight
$Al_2O_3$  20.4 % by weight
$Li_2O$  5.4 % by weight
$Na_2O$  12.7 % by weight
Softening point  670°C
Annealing point  502°C
Strain point  483°C This glass is placed in the standard apparatus used to affect ion replacement of glass such as that disclosed in the Weber patent hereinbefore referred to. The salt used to exchange ions with the glass is potassium nitrate so that potassium ions are replacing the sodium and lithium ions. The glass is held at a temperature slightly over 502°C and a current of between 3 and 4 milliamps is applied for about two hours to carry out step one of the instant process. In step two of the process all that is changed from step one is that the molten salt is a mixture of lithium and sodium nitrate and the current is allowed to flow for about 6 hours. In step three the current is reversed and the molten salt of potassium nitrate is again used to affect transfer of potassium ions for sodium and lithium ions in the opposite face of the glass. Current is allowed to flow for about 3 hours. In step four the glass is suddenly placed in a molten salt bath which is maintained at a temperature below the strain point of the glass (below 483°C). The final step is a repeat of step three except that the temperature is kept below the strain point of the glass (below 483°C).

I claim:
1. A method of strengthening glass comprising:
   1. replacing on one face of a glass which comprises at least 20 mole percent of a material selected from the group consisting of sodium oxide, lithium oxide and mixtures thereof, cations of a material selected from the group consisting of lithium, sodium and mixtures thereof, by larger cations;
   2. replacing at least part of said larger cations introduced into said glass in step (1) with smaller cations and simultaneously replacing at least part of the cations selected from the group consisting of lithium, sodium and mixtures thereof which are originally present in said glass with the larger cations introduced into the glass in step (1),
   3. replacing on the face of the glass opposite that treated earlier the cations selected from the group consisting of sodium, lithium and mixtures thereof with larger cations;
   4. chill-tempering said glass and;
   5. replacing at least part of the small cations selected from the group consisting of lithium, sodium and mixtures thereof which were originally present in said glass with the larger cations introduced into the glass in step (3) and simultaneously replacing at least part of the larger cations introduced into the glass in step (3) by more larger cations;
   wherein steps 1-3 are performed at a temperature above the annealing temperature of the glass and below the softening point and step 5 is performed below the strain point of the glass.
2. The method of claim 1 wherein the larger cations which are used to replace the cations selected from the group consisting of lithium, sodium and mixtures thereof, are selected from the group consisting of sodium, potassium, copper, silver and mixtures thereof.
3. The method of claim 2 wherein said larger cations are potassium.
4. The method of claim 1 wherein the charge transfer of step (2) is greater than the charge transfer of steps (3) and (5) combined.
5. The method of claim 2 wherein the charge transfer of step (2) is greater than the charge transfer of steps (3) and (5) combined.

6. The method of claim 3 wherein the charge transfer of step (2) is greater than the charge transfer of steps (3) and (5) combined.

7. The method of claim 4 wherein the charge transfer of step (2) is about three times the charge transfer of step (1).

8. The method of claim 5 wherein the charge transfer of step (2) is about three times the charge transfer of step (1)

9. The method of claim 6 wherein the charge transfer of step (2) is about three times the charge transfer of step (1).

10. The method of claim 4 wherein the charge transfer of steps (3) and (5) are about equal.

11. The method of claim 5 wherein the charge transfer of steps (3) and (5) are about equal.

12. The method of claim 6 wherein the charge transfer of steps (3) and (5) are about equal.

13. The method of claim 7 wherein the charge transfer of steps (3) and (5) are about equal.

14. The method of claim 8 wherein the charge transfer of step (3) and (5) are about equal.

15. The method of claim 9 wherein the charge transfer of steps (3) and (5) are about equal.

16. The method of claim 10 wherein the charge transfer of step (3) is about equal to the charge transfer of step (1).

17. The method of claim 11 wherein the charge transfer of step (3) is about equal to the charge transfer of step (1).

18. The method of claim 12 wherein the charge transfer of step (3) is about equal to the charge transfer of step (1).

19. the method of claim 13 wherein the charge transfer of step (3) is about equal to the charge transfer of step (1).

20. The method of claim 14 wherein the charge transfer of step (3) is about equal to the charge transfer of step (1).

* * * * *